Feb. 6, 1968  D. R. MATTSON  3,367,683
HOSE COUPLING
Filed Aug. 27, 1965
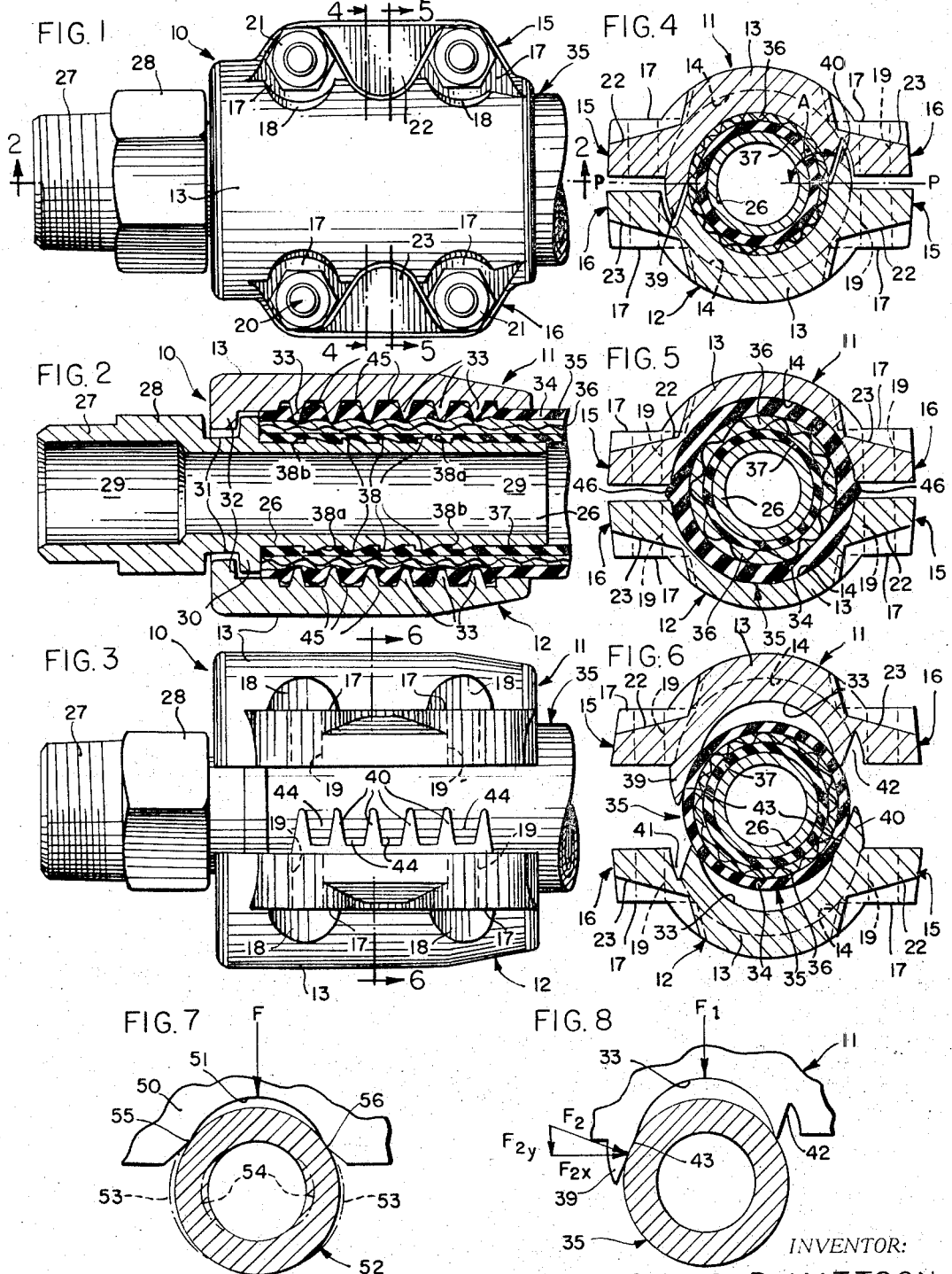
INVENTOR:
DONALD R. MATTSON
BY
Marzall, Johnston, Cook & Root
ATT'YS

United States Patent Office 3,367,683
Patented Feb. 6, 1968

3,367,683
HOSE COUPLING
Donald R. Mattson, Antioch, Ill., assignor to Anchor Coupling Co. Inc., Libertyville, Ill., a corporation of Illinois
Filed Aug. 27, 1965, Ser. No. 483,200
3 Claims. (Cl. 285—243)

ABSTRACT OF THE DISCLOSURE

A split clamp hose coupling embodying complementary half sections, each having a series of longitudinally spaced tines on one side and mating tine-receiving pockets on the other to minimize extrusion of hose material between the sections along the opposite sides thereof.

---

This invention relates to couplings for flexible tubes, hoses, and the like, and, more particularly, pertains to improvements in split coupling structures adapted to effectively hold an end of a flexible tube, hose, or the like, and a tubular coupling insert in fluid tight relationship by the use of a split clamp tightened about the hose and tubular insert. The invention has particular application to couplings subjected to severe pressure demands, such as occur in high pressure hydraulic lines.

In general, split clamp couplings for hoses, and the like, comprise a mandrel or tubular insert, a portion of which is pushed into the end of the hose. The other portion of the tubular insert or mandrel is located beyond the end of the hose and carries any suitable means, such as threads, for connecting the hose with another member. A pair of clamp halves are placed opposite each other on the hose in a position whereby they clamp the hose about the mandrel when the clamp halves are drawn together. The clamp halves are drawn together by bolts or the like to compress the hose between the clamp halves and an end of the hose in which is positioned the mandrel or tubular insert.

Most split couplings involve clamp halves which never come completely together, that is to say, they never fully encompass or surround the hose. Between opposing faces of said clamp halves there are two small gaps on diametrically opposite sides. These gaps have not been found to be troublesome in effecting a tight seal between the inner face of the hose and the tubular insert therein for most types of fluids, but said gaps have proved troublesome in applications of such hose couplings in high temperature, high pressure oil systems. In such applications it has been found that the elastomeric cover of a hose tends to be extruded into the gaps between the clamp halves. When such extrusion occurs, the compression of the hose against the tubular insert is reduced and becomes less uniform. Such reduction in compression increases the possibility of a leakage path between the inner tube of the hose and the tubular insert therein.

Such extrusion can be readily understood from the existence of the high compression loads on the hose by the coupling and the known tendency for rubber to extrude under high unit loads into areas of lower unit loads (the gaps). Another contributing factor to such extrusion is that the coefficient of expansion of rubber with increase in temperature is greater than that for steel or iron or other metal from which hose couplings are made. The heated rubber must expand somewhere, and the gap between the clamp halves provides such area for expansion.

The most obvious way to overcome the extrusion problem is to totally confine the hose between the clamp halves so as to prevent hose extrusion, e.g., by halving the clamp halves interlock. This method of preventing extrusion is not new and has been described, for example, in U.S. Patent Nos. 1,004,634; 1,066,214; and 2,166,524.

The main disadvantage with interlocking clamp halves is their inability to physically increase the loading on the side of the hose beyond the initially designed interference between the locking lugs and the hose.

Another prior approach to overcoming the aforesaid extrusion problem is described in U.S. Patent No. 1,522,-013, which shows a method for physically increasing the load in the side of the hose as the hose clamps are pulled together. In this patent separate pieces are used between the clamp halves. As the clamp halves are drawn together, these separate pieces are forced inwardly against the sides of the hose by the action of cam angles designed in the hose clamp structure.

This invention proposes a new approach in split clamp structures in which a series of spaced, rigid tines or fingers are provided on the clamp halves for physically increasing the loading on diametrically opposite sides of the hose as the clamps are drawn together. One row or series of such fingers or tines is provided along an edge of the substantially cylindrically shaped inner face of the center segment of each clamp half to provide a row or series of spaced, rigid, hose contacting faces disposed at an obtuse angle with respect to the mid-plane between opposing faces of the clamp halves. As the clamp halves are drawn together, the two rows or series of spaced fingers or tines press inwardly against diametrically opposite sides of the hose clamp and physically increase the loading on said sides. When the clamp halves are in assembled relationship the tines or fingers project into mating recesses or openings in the opposing face of the opposite clamp, whereby the clamp halves are interlocked by the fingers and the hose is completely encircled in the area of said tines or fingers, except for small gaps in the spaces between the tines or fingers.

Among the advantages afforded by the invention are included the provision of spaced areas in which the hose is completely encircled by the split clamp halves, the keeping of extrusion gaps at a minimum, the ability to reduce the compression diameter on diametrically opposite sides of the hose by pulling the clamp halves together without the resort to separate pieces, and, as a result of reduction of said compression diameter, an ability to increase the compressive loading by the coupling around the entire hose periphery.

It is, therefore, a primary object of this invention to provide a split clamp coupling for elastomer hoses, tubes, and the like providing improvements in compressive loading on the clamped tube, hose, or the like around the entire periphery thereof when the clamp halves are drawn together.

Another object of the invention is to provide split couplings utilizing clamp halves having projecting tines or fingers arranged in a row on one side of each coupling for improving compressive loading by the coupling about the periphery of the hose, tube, or the like when the clamps are drawn together.

Still another object of the invention is to provide split couplings of the aforesaid character in which the fingers or tines constitute members providing complete encirclement of the hose, tube, or the like in the assembled coupling.

A still further object of the invention is to provide new and useful clamp halves for tubes, hoses, or the like embodying the aforesaid fingers or tines.

A still further object is to provide clamp halves of the aforesaid character embodying mating recesses adapted to receive the fingers or tines of the opposing clamp half when the two clamp halves are drawn together.

The foregoing and numerous other important advantages inherent functions of the invention will become apparent as the same is more fully understood from the following description, which, taken in connection with the accompanying drawing, discloses a preferred embodiment of the invention.

In the drawing:

FIGURE 1 is a bottom plan view of an embodiment of an assembled coupling on the end of a wire-reinforced hose;

FIG. 2 is a sectional view taken on section plane 2—2 of FIG. 1;

FIG. 3 is a side elevation of the assembly of FIG. 1 with the clamp halves spread apart and positioned about the end of the hose just prior to drawing said clamp halves together;

FIG. 4 is a sectional view taken on section plane 4—4 of FIG. 1;

FIG. 5 is a sectional view taken on section plane 5—5 of FIG. 1;

FIG. 6 is a sectional view taken on section plane 6—6 of FIG. 3;

FIG. 7 is a diagrammatic view of a segment of a prior art clamp half and shows the forces exerted on a rubber hose, tube, or the like as the clamp half is drawn about the hose, tube, or the like and toward the opposite clamp half (not shown); and FIG. 8 is a diagrammatic illustration similar to FIG. 7 and illustrates the compressive forces provided under the same conditions by the clamp half of the invention.

To illustrate the invention, the drawings show a split coupling 10 comprising a pair of preferably identical clamp halves 11 and 12. Each clamp half has an arcuate center section 13 with an arcuate inner wall 14 defining an arch which is slightly less than semicylindrical. Each clamp half 11 and 12 further has a pair of opposite, laterally extending flanges 15 and 16. The respective outer faces of the flanges 15 and 16 are provided with flat lands 17 in cut-out portions or recesses 18 on the outer sides of the flanges and the contiguous portion of the center section 13. At said recesses, the flanges are provided with apertures or bolt-accommodating passages 19, respective pairs of said apertures being aligned when the clamp halves are in assembled relationship. The respective, aligned pairs of apertures 19 receive the respective shanks of bolts 20. The bolts 20 have the usual bolt head (not shown) and a threaded shank on which are threaded the nuts 21. The bolts 20 and nuts 21 are used to draw the clamp halves together to provide the compressive loading, hereinafter described, on the hose, tube, or the like. Between the recesses 18 the flanges 15 and 16 have tapered center sections 22 and 23.

The coupling further comprises a metal, tubular insert or mandrel 26 having an outer, preferably threaded, end 27 for attaching the coupling to an associated conduit. The outer end of the insert or mandrel 26 may be further provided with a hexagonal section 28 for gripping the latter with a wrench.

The insert or mandrel 26 has an axial fluid passage 29. Adjacent to, but spaced from, the hexagonal section 28, the insert or mandrel 26 has an annular rib 30 providing between it and the hexagonal section 28 an annular groove 31. This groove receives the respective arcuate lips 32, which extend radially inwardly into the groove 31 when the clamp halves 11 and 12 are in assembled relationship (FIG. 2). This groove-lip structure prevents axial slippage of the insert or mandrel 26, relative to the clamp halves 11 and 12.

The clamp halves 11 and 12 each have on their inner wall 14 a plurality of spaced transversely extending, longitudinally curved ribs 33 which bite into the elastomer, outer cover or sheath 34 of hose 35 when the clamp halves are drawn together (FIG. 2). The purpose of the ribs 33 is to compress the hose carcass between the ribs 33 and the insert 26, to prevent fluid leakage as well as to keep the hose 35 tightly held in the assembled coupling.

As illustrated, the hose 35 comprises the aforesaid outer sheath or cover, an intermediate wire reinforcement layer 36 and an elastomer, inner layer 37. The inner layer 37 fits tightly about the tubular insert 26. The outer surface of the tubular insert has a plurality of axially spaced, circumferential ribs 38 having sloping front faces 38a to facilitate sliding of the hose 35 over the outer face of the insert. The rear faces 38b of the annular ribs 38 are substantially normal to the longitudinal axis of the insert so that the ribs 38 may engage the inner layer 37 of the hose in a manner to resist sliding displacement of the hose 35 on the insert.

Each clamp half 11 and 12, along one side thereof has a plurality of longitudinally spaced, tapered fingers or tines 39 and 40, respectively, arranged in a longitudinal row. These fingers or tines 39 and 40 fit into mating, tapered recesses 41 and 42, respectively, in the opposing faces of clamp halves 12 and 11, respectively, when the clamp halves are drawn together. In the illustrated embodiment, the fingers or tines 39 and 40 constitute extensions of one end of the respective ribs 33. The fingers or tines project from respective opposing faces of clamp halves 11 and 12 and provide hose-contact faces 43 which are substantially diametrically opposite and are substantially planar. The respective planes of faces 43 are disposed at an angle A of the order of 110°±10° with respect to a mid-plane PP between the clamp halves (see FIG. 4). In the illustrated embodiment the angle A is the preferred angle of about 110°.

When the clamp halves 11 and 12 are in assembled relationship and drawn tightly about the hose 35 and tubular insert or mandrel 26, the portions of said clamp halves embodying the tines or fingers 39 and 40 completely circumscribe the hose 35. The spaces or gaps 44 between fingers or tines 39 and 40 constitute, in the assembled clamp, a series of small spaces into which the outer sheath or cover 34 of hose 35 can expand or extrude in the form of small bulges 46 (FIG. 5). These spaces 44 are beneficial in the even distribution of high compression or stress loading between the outer surface of tubular insert or mandrel 26 and the inner tube 37 when clamp halves 11 and 12 are drawn together in the relationships illustrated in FIGS. 2, 4 and 5, the spaces permitting the formation of bulges 46, which form as a result of the radially inward compressive loading on the hose 35 by the ribbed, inner walls of clamp halves 11 and 12. Elastomers, such as rubber, are essentially incompressible, and the outer sheath 34 thereby expands into grooves 45 between ribs 33 and also into the gaps 44 in the form of bulges 46.

FIGURE 7 illustrates diagrammatically the tendency of a prior art clamp half to deform laterally a hose or the like as the clamp half is drawn about the hose. The prior art clamp half 50 has a semi-cylindrical, hose contacting face 51 usually having ribs of the character of ribs 33. As the two clamp halves are drawn together by tightening bolts of the character of the previously illustrated bolts about an elastomer hose or tube 52, there is exerted an effective force indicated by the force F. The points of initial contact 55 and 56 of clamp half 50 and hose 52 causes said hose to deform laterally by forming a pair of outwardly and oppositely extending bulges 53 on the outer surface of hose 52, and corresponding concave deformities 54 on the inner walls of tube 52. This type of initial loading of the hose, as the clamp halves are drawn together, has not proved troublesome for most hose-clamp applications, but, as aforesaid, the ultimate sealing relationship between the tubular insert or mandrel and the inner face of the hose has proven inadequate in high temperature, high pressure hydraulic systems.

FIGURE 8 constitutes a similar, diagrammatic illustration of the loading on the hose as the clamp halves of the invention are drawn together. The effective force $F_1$ is applied as the clamp halves are drawn together. The faces 43 of fingers or tines 39 constitute sloping faces, which slope in a plane at an acute angle of the order of $10°$–$30°$ with respect to the direction of the effective force $F_1$. As the clamp halves are drawn together, each set or series of fingers or tines 39 exerts at radially opposite points on the outer surface of the hose 35 a force $F_2$ having a horizontal vector $F_{2x}$ and a vertical vector $F_{2y}$. The opposing forces $F_2$ on diametrically opposite sides of the hose 35 eliminate the tendency for lateral deformation of the character described and illustrated in FIG. 7. When clamp halves 11 and 12 are drawn together as illustrated in FIGS. 2, 4 and 5, the ultimate result is a substantially uniform compression or stress loading between the tubular insert or mandrel 26 and the inner tube 37 of hose 35, thereby providing a more effective fluid tight seal between said insert or mandrel and said inner tube.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A split clamp hose coupling comprising a tubular insert, a pair of complementary facing clamp half sections adapted to be drawn together to clamp a hose therebetween and upon the tubular insert, said clamp sections each having a medial semicylindrical hose clamping portion and a pair of outstanding co-planar flanges, at the opposite sides of said medial portion, said flanges having flat coplanar faces adapted to be disposed in facing parallel relationship when the sections are in clamping position, the flanges of a complementary pair of such clamp sections having coaxially aligned bolt holes extending normal to the mid-plane between the facing sections, bolts in said holes for drawing the sections together, said medial portions having opposing and substantially cylindrically curved and mutually inwardly facing surfaces, a series of spaced, inwardly directed, arcuate ribs extending radially inwardly from the cylindrically curved surfaces of each of said complementary half sections, a series of spaced tines projecting from and each forming an extension of a corresponding one of said ribs, along one longitudinal edge of the substantially cylindrically curved surfaces of each clamp section, said tines extending outwardly of the face of a said flange, and recesses formed in the said ribs, at the other longitudinal edge of said substantially cylindrically curved surfaces, said recesses being disposed between the ends of the ribs and a said flange in position to receive the tines of the complementary clamp half section therein, when the sections are in clamping relationship about said hose, said tines being disposed in said recesses radially outwardly of the said ends of the ribs and radially inwardly of said flange, said tines having inclined surfaces disposed in position to engage opposite sides of the hose, tangentially and at an appreciable angle with respect to a longitudinal plane, extending through a complementary pair of said sections, medially between and parallel with the axes of said bolt holes, as the complementary pair of clamp half sections are drawn together upon a hose to be clamped.

2. A coupling, as set forth in claim 1, wherein the hose-engaging surfaces of said tines are substantially planar faces disposed at an angle of the order of $110°\pm10°$, with respect to the mid-plane extending between said clamp half sections when drawn together in hose clamping relation.

3. A coupling, as set forth in claim 1, wherein the hose-engaging surfaces of said tines are substantially planar faces disposed at an angle of the order of $20°\pm10°$, with respect to a longitudinal plane extending through the facing sections, medially between and parallel with the axes of the bolt holes, when the sections are in facing hose clamping relation.

References Cited

UNITED STATES PATENTS

| | | | |
|---|---|---|---|
| 858,575 | 7/1907 | Claflin | 285—253 X |
| 1,490,760 | 4/1924 | Black | 285—253 X |
| 2,166,524 | 7/1939 | Goodall | 285—253 |
| 2,690,193 | 9/1954 | Smith | 285—373 X |
| 3,181,900 | 5/1965 | Hayward | 285—243 |
| 3,249,371 | 5/1966 | Peterman | 285—253 |

FOREIGN PATENTS 707,657    4/1965    Canada.

CARL W. TOMLIN, *Primary Examiner.*

THOMAS F. CALLAGHAN, *Examiner.*